(12) United States Patent
Mondal et al.

(10) Patent No.: US 9,146,823 B2
(45) Date of Patent: Sep. 29, 2015

(54) TECHNIQUES FOR TESTING ENCLOSURE MANAGEMENT CONTROLLER USING BACKPLANE INITIATOR

(71) Applicant: AMERICAN MEGATRENDS, INC., Norcross, GA (US)

(72) Inventors: Umasankar Mondal, Snellville, GA (US); Roger Smith, Suwanee, GA (US); Jay Pancholi, Duluth, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 259 days.

(21) Appl. No.: 13/943,053

(22) Filed: Jul. 16, 2013

(65) Prior Publication Data

US 2015/0026526 A1 Jan. 22, 2015

(51) Int. Cl.
*G06F 11/00* (2006.01)
*G06F 11/22* (2006.01)
(52) U.S. Cl.
CPC .......... *G06F 11/221* (2013.01); *G06F 11/2236* (2013.01)
(58) Field of Classification Search
CPC ................. G06F 11/221; G06F 11/2236
See application file for complete search history.

(56) References Cited

U.S. PATENT DOCUMENTS

| | | |
|---|---|---|
| 6,826,714 B2 * | 11/2004 | Coffey et al. .................... 714/25 |
| 2012/0173944 A1* | 7/2012 | Pan .............................. 714/734 |
| 2013/0080697 A1* | 3/2013 | Dhandapani et al. .......... 711/114 |

* cited by examiner

*Primary Examiner* — Yolanda L Wilson
(74) *Attorney, Agent, or Firm* — Locke Lord LLP; Tim Tingkang Xia, Esq.

(57) ABSTRACT

One aspect of the present disclosure relates to a backplane initiator for testing enclosure management controller. The backplane initiator includes: an initiator board and an initiator control application. The initiator board includes initiator controller, at least one SGPIO interface, at least one SMBus interface, and a first communication interface. The initiator controller is configured to transmit control commands and data according to enclosure management protocol through the SGPIO interface and the SMBus interface to an EMC. The initiator control application, when executed on a computing device having a second communication interface in communication with the first communication interface, is configured to establish a communication channel with the initiator controller through the first and second communication interfaces, and instruct the initiator controller to transmit a first control command and first control data according to enclosure management protocol through the SGPIO interface and the SMBus interface to the EMC.

20 Claims, 7 Drawing Sheets

TECHNIQUES FOR TESTING ENCLOSURE MANAGEMENT CONTROLLER USING BACKPLANE INITIATOR

FIELD

The present disclosure generally relates to a host bus adapter and an enclosure management controller (EMC), and more particularly to techniques for testing an EMC using a backplane initiator.

BACKGROUND

In large scale computing systems, a backplane is used to mount a number of storage drives and network communication devices, such as Disk Arrays, redundant array of independent disks (RAID) Subsystems, Small Computer System Interface (SCSI) and Fiber Channel (FC) Disk Array or Switched Disk Array Servers, and Telecommunication Equipment. A host bus adapter (HBA) is used to facilitate the communication between a host computer and the backplane, and allows the host computer to monitor and manage the storage and network devices installed on the backplane. The HBA provides an operator with detailed information regarding the presence and status of mass storage devices and network devices, and provides facilities for generating visual indicators based upon backplane management data received from the HBA of the host computer. For instance, individual light-emitting diodes ("LEDs") may be driven by a backplane for displaying information regarding the activity, failure, rebuild status, and other information for each of the mass storage devices connected to the backplane. In order to provide these indicators and other types of functionality, a backplane typically provides connections for multiple mass storage devices, such as hard disk drives. The backplane also interfaces with an HBA and provides an interface through which the HBA may communicate with the mass storage devices. A backplane also may receive and transmit backplane management data to and from the HBA. Backplane management data is any data relating to the provision of backplane management services by a backplane.

Several different physical interfaces may be utilized to deliver backplane management data between an HBA and a backplane. For instance, some Serial Attached SCSI ("SAS")-compatible HBAs are equipped with a serial general purpose input/output interface ("SGPIO"). Some Serial Advanced Technology Attachment ("SATA")-compatible HBAs, on the other hand, utilize a control or management bus, such as the system management bus, to exchange backplane management data between the backplane and the HBA. For various reasons, some vendors have decided on some HBA models, to implement a backplane management protocol based on the SMBus, even for SAS HBAs, which could be for backward compatibility reasons with SATA backplanes.

The particular protocol utilized to transfer backplane management data between the backplane and the HBA may also vary from vendor to vendor. However, the most popular protocols used in the backplane management are: the SCSI Enclosure Services (or SES) utilizing the system management bus (or I$^2$C bus), and the SGPIO protocol utilizing an SGPIO interface to exchange backplane management information between the HBA and the backplane.

Both software and hardware of newly developed enclosure management controller need to be tested for its compatibility with HBAs of various manufactures. In order to provide backplane solutions supporting the various physical interfaces for exchanging backplane management data, the various standard protocols for exchanging backplane management data, and the various manufacturer-specific protocols for exchanging backplane management data, it has previously been necessary to provide HBAs from various manufacturers, and configured for each particular combination of physical interface and protocol to ascertain the software and hardware of newly developed enclosure management controller (EMC) support standard SGPIO commands. However, providing a separate HBA for each combination of physical interface and protocol can be extremely cost-inefficient and time consuming. Conventionally, in order to ascertain compatibility with various vendors' HBA, many actual HBAs were ordered from various vendors to be tested with the new EMCs. But this process can be very costly and time consuming, because a large number of HBAs have to be ordered from various vendors and tested with the hardware and software of the new EMC. For example, it took about one and a half month to two months to test each HBA from one vendor.

Therefore, heretofore unaddressed needs still exist in the art to address the aforementioned deficiencies and inadequacies.

SUMMARY

One aspect of the present disclosure relates to a backplane initiator for testing an enclosure management controller (EMC). In certain embodiments, the backplane initiator includes an initiator board and an initiator control application. The initiator board includes: (a) an initiator controller, (b) at least one SGPIO interface, (c) at least one SMBus interface, and (d) a first communication interface The initiator controller is configured to transmit control commands and control data in accordance with an enclosure management protocol through at least one of the SGPIO interface and the SMBus interface to an EMC. The initiator control application, when executed on a computing device having a second communication interface in communication with the first communication interface, is configured to: (a) establish a communication channel with the initiator controller through the first and second communication interfaces, and (b) instruct the initiator controller to transmit a first control command and first control data in accordance with an enclosure management protocol through at least one of the SGPIO interface and the SMBus interface to the EMC. In certain embodiments, the first and second communication interfaces are peripheral component interconnect (PCI) interfaces.

In certain embodiments, the initiator controller is configured to receive testing instructions from the initiator control application and send a corresponding testing command to the EMC over the SGPIO interface and the SMBus interface. The SMBus interface includes a first SMBus interface and a second SMBus interface. The backplane initiator also includes at least one of: (a) an SGPIO testing module configured to send a plurality International Blinking Pattern Interpretation (IBPI) testing commands to the EMC over the SGPIO interface, (b) an SMBus testing module configured to send a plurality of SMBus testing commands to the EMC over the first SMBus interface, (c) an SCSI Enclosure Services (SES) testing module configured to send a plurality of SES testing commands to the EMC over the first SMBus interface, and (d) an IPMI testing module configured to send a plurality of IPMI testing commands to the EMC over the second SMBus interface.

In certain embodiment, the plurality IBPI testing commands includes one or more standard IBPI commands defined in the IBPI specification, the plurality of SMBus testing commands includes one or more standard SMBus commands defined in the SMBus specification, the plurality of IPMI testing commands includes one or more standard IPMI commands defined in the IPMI specification, and the plurality of IPMI testing commands includes a plurality of extended OEM IPMI commands.

In certain embodiments, the first control command and the first control data are configured according to the SES specification to instruct the EMC to drive a plurality of light emitting diodes (LEDs) installed on an enclosure managed by the EMC. In certain embodiments, the initiator control application has a graphic user interface that allows a user to input the first control command and first control data.

Another aspect of the present disclosure relates to a computer-implemented method for testing an enclosure management controller (EMC). The computer-implemented method includes: (a) providing an initiator board, and (b) executing an initiator control application on a computing device. The initiator board includes: (a) an initiator controller, (b) at least one SGPIO interface, (c) at least one SMBus interface; and (d) a first communication interface. The initiator controller is configured to transmit control commands and control data according to an enclosure management protocol through at least one of the SGPIO interface and the SMBus interface to an EMC. The computing device has a second communication interface in communication with the first communication interface, and the initiator control application is configured to: (a) establish a communication channel with the initiator controller through the first and second communication interfaces, and (b) instruct the initiator controller to transmit a first control command and first control data according to an enclosure management protocol through at least one of the SGPIO interface and the SMBus interface to the EMC. The first and second communication interfaces are peripheral component interconnect (PCI) interfaces.

In certain embodiments, the initiator controller is configured to receive testing instructions from the initiator control application and send a corresponding testing command to the EMC over at least one of the SGPIO interface and the SMBus interface. The SMBus interface includes a first SMBus interface and a second SMBus interface. The backplane initiator further includes at least one of: (a) an SGPIO testing module configured to send a plurality International Blinking Pattern Interpretation (IBPI) testing commands to the EMC over the SGPIO interface, (b) an SMBus testing module configured to send a plurality of SMBus testing commands to the EMC over the first SMBus interface, (c) an SCSI Enclosure Services (SES) testing module configured to send a plurality of SES testing commands to the EMC over the first SMBus interface, and (d) an IPMI testing module configured to send a plurality of IPMI testing commands to the EMC over the second SMBus interface.

A further aspect of the present disclosure relates to a non-transitory computer storage medium having computer-executable instructions stored. When the computer-executable instructions are executed by a processor of a computing device, the computer-executable instructions cause the processor to: (a) communicating with an initiator board through a first communication interface of the initiator board, and (b) executing an initiator control application on the processor of the computing device having a second communication interface in communication with the first communication interface. The initiator board has: (a) an initiator controller, (b) at least one SGPIO interface, (c) at least one SMBus interface, and (d) the first communication interface. The initiator controller is configured to transmit control commands and control data in accordance with an enclosure management protocol through at least one of the SGPIO interface and the SMBus interface to an EMC. The initiator control application is configured to: (a) establish a communication channel with the initiator controller through the first and second communication interfaces, and (b) instruct the initiator controller to transmit a first control command and first control data according to an enclosure management protocol through at least one of the SGPIO interface and the SMBus interface to the EMC. The first and second communication interfaces are peripheral component interconnect (PCI) interfaces.

BRIEF DESCRIPTION OF THE DRAWINGS

The accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION

Figure 1:
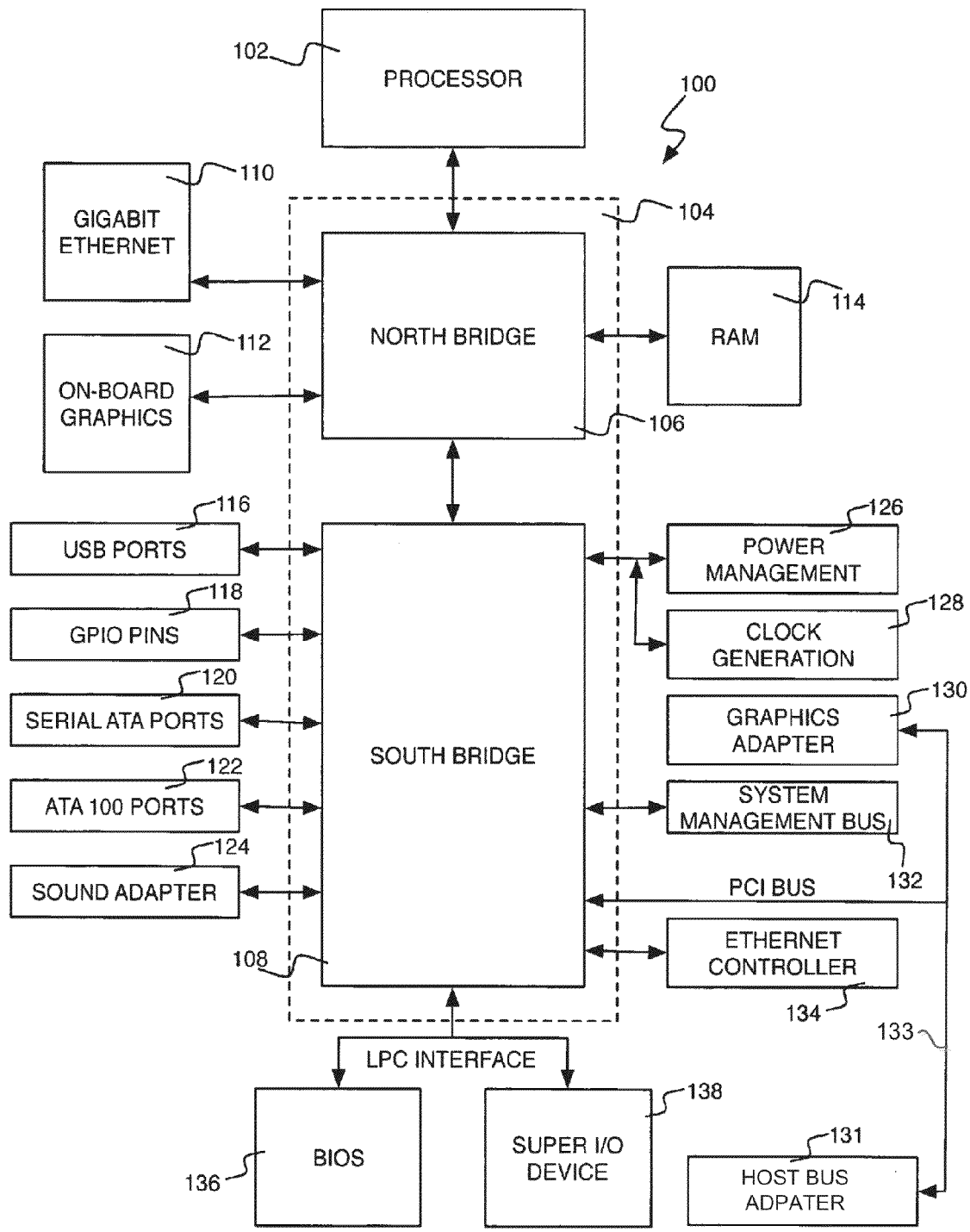
FIG. 1 schematically shows a computer architecture diagram showing aspects of a computer utilized as an illustrative operating environment for the various embodiments of the present disclosure.

The present disclosure is more particularly described in the following examples that are intended as illustrative only since numerous modifications and variations therein will be apparent to those skilled in the art. Various embodiments of the present disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the present disclosure, and in the specific context where each term is used. Certain terms that are used to describe the present disclosure are discussed below, or elsewhere in the specification, to provide additional guidance to the practitioner regarding the description of the present disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the present disclosure or of any exemplified term. Likewise, the present disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximates, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, FIGS. 1-5, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art. Like numbers refer to like elements throughout.

FIG. 1 and the following discussion are intended to provide a brief, general description of a suitable computing environment in which the present disclosure may be implemented. Generally, program modules include routines, programs, components, data structures, and other types of structures that perform particular tasks or implement particular abstract data types. Moreover, those skilled in the art will appreciate that the present disclosure may be practiced with other computer system configurations, including hand-held devices, multi-processor systems, microprocessor-based or programmable consumer electronics, minicomputers, mainframe computers, and the like. The present disclosure may also be practiced in distributed computing environments where tasks are performed by remote processing devices that are linked through a communications network. In a distributed computing environment, program modules may be located in both local and remote memory storage devices.

Referring now to FIG. 1, details regarding an illustrative operating environment for embodiments of the present disclosure will be provided. In particular, FIG. 1 illustrates a computer configuration for practicing the embodiments of the present disclosure. It should be appreciated, however, that although the embodiments of the present disclosure described herein are discussed in the context of a conventional desktop or server computer, the embodiments of the present disclosure may be utilized with virtually any type of computing device.

As described briefly above, the embodiments of the present disclosure provide a method and integrated circuit for enabling the use of multiple backplane management interfaces and multiple backplane management protocols. FIG. 1 illustrates a host computer that, as will be described in greater detail below, may utilize one or more backplanes to interface with one or more mass storage devices. The backplanes described herein are equipped with an integrated circuit capable of utilizing multiple interfaces and protocols for exchanging backplane management information with the computer 100 or with another computer equipped with a host bus adapter (HBA) utilizing a different backplane management interface and protocol. It should be appreciated that the architecture of the computer 100 is merely illustrative and that any type of computer capable of hosting an HBA with backplane management functionality may be utilized.

An illustrative computer architecture for practicing the various embodiments of the present disclosure will now be described. In particular, a computer 100 is utilized that is equipped with an HBA. In order to provide this functionality, the computer 100 includes a baseboard, or "motherboard", which is a printed circuit board to which a multitude of components or devices may be connected by way of a system bus or other electrical communication path. In one illustrative embodiment, a processor ("processor" or "CPU") 102 operates in conjunction with a chipset 104. The CPU 102 is a standard central processor that performs arithmetic and logical operations necessary for the operation of the computer 100.

The chipset 104 includes a north bridge 106 and a south bridge 108. The north bridge 106 provides an interface between the CPU 102 and the remainder of the computer 100. The north bridge 106 also provides an interface to the random access memory ("RAM") 114 and, possibly, an on-board graphics adapter 112. The north bridge 106 may also include functionality for providing networking functionality through a gigabit Ethernet adapter 110. The gigabit Ethernet adapter 110 is capable of connecting the computer 100 to another computer via a network. Connections which may be made by the network adapter 110 may include local area network ("LAN"), wide area network ("WAN") or Wi-Fi connections. LAN, WAN and Wi-Fi networking environments are commonplace in offices, enterprise-wide computer networks, intranets, and the Internet. The north bridge 106 is connected to the south bridge 108.

The south bridge 108 is responsible for controlling many of the input/output functions of the computer 100. In particular, the south bridge 108 may provide one or more universal serial bus ("USB") ports 116, a sound adapter 124, an Ethernet controller 134, and one or more general purpose input/output ("GPIO") pins 118. The south bridge 108 may also provide a system management bus 132 for use in managing the various components of the computer 100. Power management circuitry 126 and clock generation circuitry 128 may also be utilized during the operation of the south bridge 108. The south bridge 108 may also provide a bus for interfacing peripheral card devices such as a graphics adapter 130. In one embodiment, the bus comprises a peripheral component interconnect ("PCI") bus 133. The PCI bus 133 may also be utilized to interface with one or more host bus adapters (HBAs), such as the SATA or SAS HBA 131. As described in greater detail below, the HBA 131 may be connected to a backplane for providing backplane management functionality.

According to embodiments, the south bridge 108 can be an enhanced south bridge operative to provide an HBA for connecting mass storage devices to the computer 100 without the use of an add-in card such as the PCI HBA 131. For instance, according to an embodiment, the south bridge 108 includes a serial advanced technology attachment ("ATA") adapter for providing one or more serial ATA ports 120 and an ATA 100 adapter for providing one or more ATA 100 ports 122. The serial ATA ports 120 and the ATA 100 ports 122 may be, in turn, connected directly to one or more mass storage devices storing an operating system and application programs. As known to those skilled in the art, an operating system comprises a set of programs that control operations of a computer and allocation of resources. An application program is software that runs on top of the operating system software and uses computer resources made available through the operating system to perform application specific tasks desired by the user. Alternatively, the serial ATA ports 120 may be connected to a backplane for providing backplane management functionality.

The mass storage devices connected to the south bridge 108, and its associated computer-readable media provide non-volatile storage for the computer 100. Although the description of computer-readable media contained herein refers to a mass storage device, such as a hard disk or CD-ROM drive, it should be appreciated by those skilled in the art that computer-readable media can be any available media that can be accessed by the computer 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a read-only memory ("ROM") device for storing a basic input/output system ("BIOS") 136 of an extensible firmware interface ("EFI") compatible firmware that includes program code containing the basic routines that help to start up the computer 100 and to transfer information between elements within the computer 100. It should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
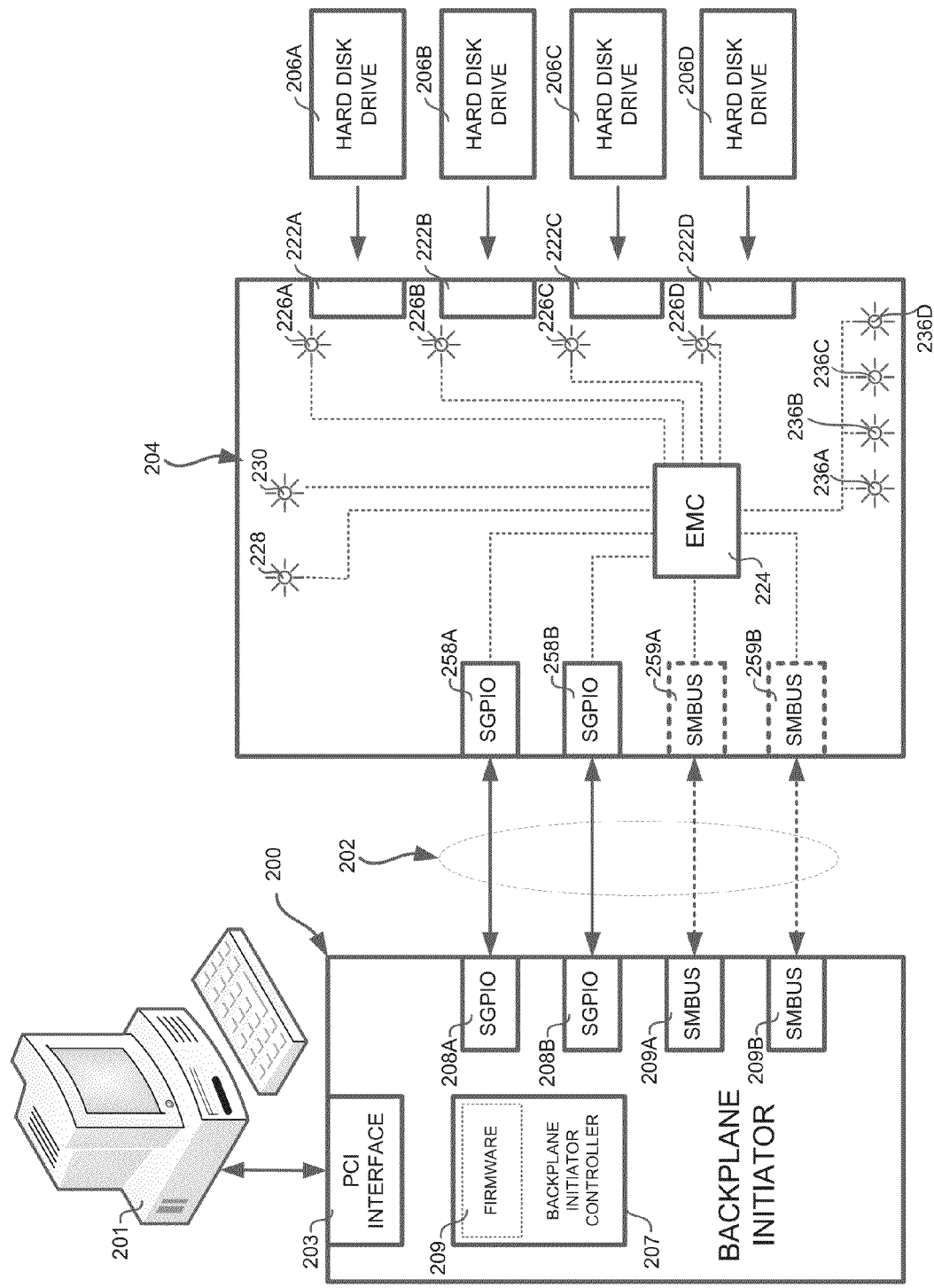
FIG. 2 schematically shows a block diagram of a backplane initiator according to certain embodiments of the present disclosure.

Turning now to FIG. 2, where a block diagram of an enclosure management controller (EMC) testing environment is schematically shown according to one embodiment of the present disclosure. This EMC testing environment includes: (1) a computer 201 having a peripheral component interconnect (PCI) bus interface and an EMC firmware testing software installed, (2) a backplane initiator 200, which is used in place of many different HBAs from various manufacturers to test the firmware and hardware of EMC and also has a PCI bus interface 203 electronically coupled to the computer 201 through a PCI link, (3) a backplane 204 having an enclosure management controller (EMC) integrated circuit (IC) 224 to be tested. Optionally, a number of hard disk drives 206A, 206B, 206C, and 206D may be installed into a set of hard disk drive connectors, 222A, 222B, 222C, and 222D of the backplane 204, respectively. Additional details regarding one operating environment for the embodiments of the present disclosure and a backplane 204 provided in embodiments of the present disclosure will be described.

In one embodiment, as shown in FIG. 2, the backplane initiator 200 has: one or more ports 208A, 208B, 209A, 209B, a PCI interface 203 for connection to the computer 201, a backplane initiator controller 207, and backplane initiator firmware 209. The backplane initiator firmware 209 runs on the backplane initiator controller 207. The backplane initiator firmware 209 is configured to (a) accept an operator's commands from a test program running on the computer 201 through the PCI interface 203, (b) parse the commands, and (c) send the testing commands to the backplane 204 over various interfaces connected to the backplane initiator 200. The ports 208A, 208B, 209A, 209B are physical links between the backplane initiator 200 and the backplane 204. In certain embodiments, the ports include the SGPIO connector 208A, the SGPIO connector 208B, the SMBus connector 209A, and the SMBus connector 209B.

According to embodiments of the present disclosure, the backplane initiator 200 is a generic replacement of various host bus adapters used to test the firmware and hardware of the enclosure management controller 224. The backplane initiator 200 can implement enclosure management commands in accordance various standard and proprietary enclosure management protocols are implemented and tested with, and then test the firmware and hardware of the EMC without actually using the HBAs from different vendors.

In one embodiment, the backplane initiator 200 can issue commands of a simulated HBA 131 to the EMC 224. For example, the commands can be those that are typically issued by a host bus adapter for use with SATA mass storage devices or compatible with SAS mass storage devices. It should be appreciated that the commands issued by the backplane initiator 200 can be those typically issued by other types of HBAs compatible with other types of mass storage devices.

According to embodiments of the present disclosure, different physical interfaces may be utilized by the backplane initiator 200 to exchange backplane management data between the backplane initiator 200 and the backplane 204. For instance, some SAS-compatible HBAs are equipped with an SGPIO interface utilizing the SGPIO connector 208A and the SGPIO connector 208B, while some SATA-compatible HBAs, on the other hand, utilize a control or management bus, such as the system management bus through the system management bus (SMBus) connector 209A and the SMBus connector 209B, to exchange backplane management data between the backplane 204 and the backplane initiator 200. System Management Bus (SMBus) Specification version 2.0, published on Aug. 3, 2000, is incorporated herein by reference in its entirety.

It should be appreciated that the particular physical interfaces described herein for exchanging backplane management information with the backplane are merely illustrative and that any physical communications link suitable for transmitting backplane management data may be utilized with the various aspects of the present disclosure. The backplane initiator 200 supports multiple backplane management interfaces and protocols, such as system management bus, SGPIO, or some custom backplane management bus. The backplane initiator 200 used in this embodiment has the SGPIO connector 208A and the SGPIO connector 208B as well as the SMBus connector 209A and the SMBus connector 209B, and can support and test backplanes 204 utilizing both the system management bus and the SGPIO bus, and all standard system management bus and SGPIO bus management commands. In many circumstances, I²C buses, connectors, and control firmware can be used in place of system management buses, connectors, and control firmware.

It is also possible that a backplane initiator can be configured to support a particular backplane management protocol by upgrading the backplane initiator firmware 209, or by using host-side applications, command line utilities, or configuration monitors i.e. over a direct serial port to the backplane initiator 200. This same access and configuration method could be used to change or otherwise configure specific instructions and commands that are sent to the backplane.

As shown in FIG. 2, an appropriate cable 202 may be utilized to connect the ports 208A, 208B, 209A, 209B of the backplane initiator 200 to the backplane 204. In particular, individual cables may be utilized to connect the selected ports 208A, 208B, 209A, 209B to the backplane 204. It should also be appreciated that although the backplane initiator 200 has been illustrated as having four ports 208A, 208B, 209A, 209B, backplane initiators with other port configurations may be used. Alternatively, the backplane 204 and the EMC IC 224 may be configured for use with either or more drives. Other configurations should also be apparent.

In certain embodiments, the backplane 204 can be SAS-compatible and has the SGPIO connector 258A and the SGPIO connector 258B. The backplane initiator 200 can accordingly act as an SAS-compatible HBA and is used to test the SAS-compatible backplane. For example, the SGPIO connector 208A and the SGPIO connector 208B of the backplane initiator 200 can be connected to the SGPIO connector 258A and the SGPIO connector 258B through appropriate SGPIO cables.

In certain embodiments, backplane 204 can be SATA-compatible and has the SMBus connector 259A and the SMBus connector 258B. The backplane initiator 200 can accordingly act as an SATA-compatible HBA and is used to test the SATA-compatible backplane. For example, the SMBus connector 209A and the SMBus connector 209B of the backplane initiator 200 can be connected to the SMBus connector 259A and the SMBus connector 259B through appropriate SMBus cables.

In certain embodiments, the backplane 204 includes operation indicator LEDs: (a) LEDs 226A-226D for indicating the presence and activities of the hard drives 206A-206D, respectively, (b) LEDs 236A-236D for indicating that one of the hard disk drives 206A-206D has failed, (c) LEDs 228, 230 for providing a global indication that one of the hard disk drives 206A-206D, or a hard disk drive connected to another connected backplane, is active or has failed. As also shown in FIG. 2, the backplane 204 includes ports 222A-222D for directly interfacing with one or more mass storage devices, such as the hard disk drives 206A-206D. According to embodiments of the present disclosure, the backplane 204 may be mounted within an enclosure such that the hard disk drives 206A-206D slide directly into the enclosure and thereby mate directly with the appropriate port 222A-222D. The backplane 204 also includes circuitry for routing signals to and from the ports 222A-222D to the appropriate portions of the multilane connector 220. In this manner, the backplane 204 enables direct communication between an HBA or, in this example, the backplane initiator 200 and the connected hard disk drives 206A-206D. Some enclosure management controllers (EMC) can support up to 8 SAS/SATA drives, features one or more of SGPIO, IBPI, USB 2.0, IPMI over SMBus, and SES-2. Some EMC IC can support two SGPIO channels and two SMBus channels for connection with an HBA. In addition, the EMC IC can have an SMBus for connection with the baseboard management controller (BMC).

As discussed briefly above, the backplane 204 provides a number of backplane management functions. To enable this functionality, the backplane 204 is equipped with a backplane management or enclosure management controller (EMC) IC 224. The EMC IC 224 is operative to receive backplane management data from the backplane initiator 200 on one of any number of physical interfaces, such as system management bus and/or SGPIO bus, and to perform various management functions in response to the management data received. For instance, the EMC IC 224 may receive data from the backplane initiator 200 instructing it to illuminate one of LEDs 226A-226D for locating a particular one of the hard disk drives 206A-206D, respectively. The EMC IC 224 may also illuminate the LEDs 226A-226D to indicate activity on the hard disk drives 206A-206D, respectively. The LEDs 236A-236D may also be illuminated by the EMC IC 224 to indicate that one of the hard disk drives 206A-206D has failed. LEDs 228, 230 may also be illuminated to provide a global indication that one of the hard disk drives 206A-206D, or a hard disk drive connected to another connected backplane, is active or has failed. The EMC IC 224 may also provide information to the backplane initiator 200. For instance, data indicating whether a particular drive is mated to the backplane 204 may be provided by the EMC controller IC 224 to the backplane initiator 200.

Figure 3:
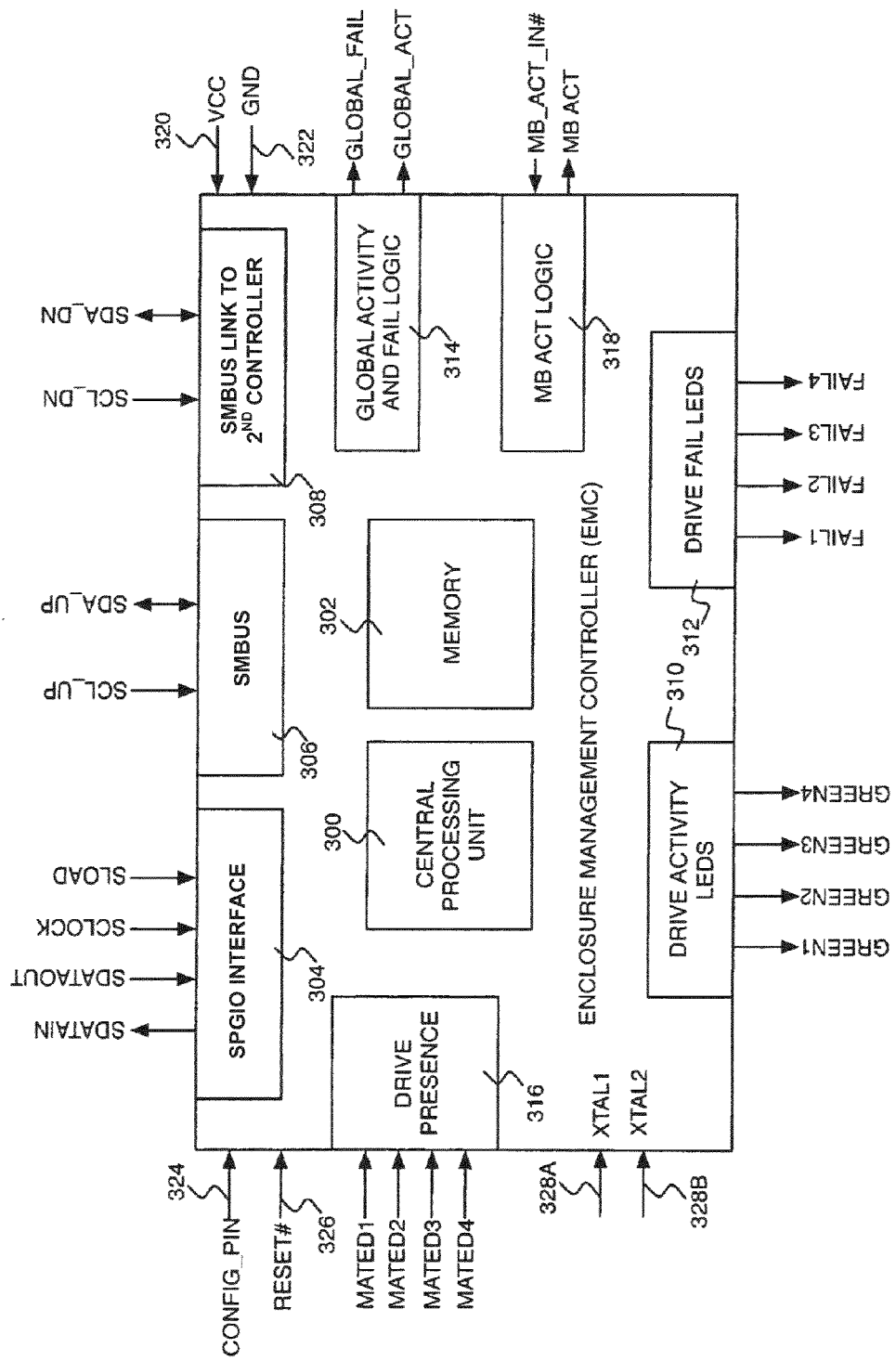
FIG. 3 shows a functional block diagram illustrating aspects of an enclosure management controller (EMC) according to certain embodiments of the present disclosure.

A functional block diagram illustrating aspects of an enclosure management controller (EMC) IC 224 provided in embodiments of the present disclosure is described here. As shown in FIG. 3, the EMC IC includes a CPU 300 and a memory 302. The CPU 300 controls the overall operation of the IC. The memory 302 may be utilized by the CPU 300 during the performance of its processing functions. It should be appreciated that although the EMC IC is described here as a programmable micro-controller including a CPU 300 and memory 302, the embodiments of the present disclosure may be implemented utilizing a general purpose computer, a custom application specific integrated circuit, a field-programmable gate array (FPGA) device, or any other type of IC or computing known to those skilled in the art.

According to embodiments, the EMC IC shown in FIG. 3 is equipped with multiple physical interfaces commonly used by various vendors for communicating backplane management data with an HBA or, in this example, the backplane initiator 200. For instance, the EMC IC may include an SGPIO interface 304 for communicating backplane management data with an SAS-equipped HBA.

The SGPIO interface connects the backplane initiator 200 and the backplane 204 with four wires. The SGPIO interface 304 supports four signals: (1) a dedicated clock line SCLOCK, (2). a SLOAD line, (3) a SDATAOUT line, and (4) a SDATAIN line. The dedicated clock line SCLOCK is driven by the backplane initiator 200 (its maximum clock rate is 100 kHz), although many implementations use slower ones (typically 48 kHz). The SLOAD line is synchronous to the clock and is used to indicate the start of a new frame of data. A new SGPIO frame is indicated by SLOAD line being high at a rising edge of a clock after having been low for at least 5 clock cycles. The following 4 falling clock edges after a start condition is used to carry a 4-bit value from the backplane initiator to the backplane; the definition of this value is proprietary and varies between system vendors. The SDATAOUT line carries 3 bits of data from the HBA to the backplane: the first bit typically carries activity; the second bit carries locate; and the third bit carries fail. A low value for the first bit indicates no activity and a high value indicates activity. The SDATAIN line is used by the backplane to send data back to the backplane initiator to indicate some condition on the backplane. The first bit being high commonly indicates the presence of a drive. The two following bits are typically unused and driven low. Because this line would be high for all 3 bits when no backplane is connected, a backplane initiator can detect the presence of a backplane by the second or third bit of the SDATAIN line being driven low. The SDATAIN line and SDATAOUT line then repeats with 3 clocks per drive until the last drive is reached, and the cycle starts over again.

According to embodiments of the present disclosure, the EMC IC is also equipped with a system management bus interface 306 for communicating backplane management data with a SATA HBA or, in this example, the backplane initiator 200. The interface 306 includes two signals: SCL_UP, the serial clock line for connection to the HBA or another upstream I$^2$C device; and SDA_UP, the serial data line for connection to the HBA or another upstream I$^2$C device. A system management bus interface 308 may also be provided for connecting to a downstream I$^2$C device. The interface 308 includes two signals: SCL_DN, the serial clock line for connection to a downstream I$^2$C device; and SDA_DN, the serial data line for connection to a downstream I$^2$C device. The SCL_UP and SCL_DN are used to synchronize all data transfers over the SMBus. The interfaces 306 and 308 may be utilized to connect multiple EMC ICs, and thereby support backplane management functions for a large number of mass storage devices. In certain embodiments, the EMC IC is also operative to determine which of the physical interfaces 304 or 306 is connected to a backplane initiator and being used for exchanging backplane management data, and to selectively utilize only the active interface.

According to embodiments of the present disclosure, the EMC IC also includes circuitry for generating output signals for driving a visual or audible indicator. For instance, an output portion 310's four wires GREEN1, GREEN2, GREEN3, and GREEN4 are electronically coupled to the LEDs 226A, 226B, 226C, and 226D as shown in FIG. 2, to drive LEDs when one or more of the connected hard disk drives are active, respectively. Similarly, an output portion 312's four wires FAIL1, FAIL2, FAIL3, and FAIL4 are electronically coupled to the LEDs 236A, 236B, 236C, and 236D as shown in FIG. 2, to drive LEDs when one or more of the connected hard disk drives has failed, respectively. It should be appreciated that a separate output is provided for driving an individual LED indicating the activity or failure of each hard disk drive.

According to other embodiments of the present disclosure, the EMC IC also includes circuitry 314 for driving the LED 228 for showing global activity and the LED 230 for showing global failure. It should be appreciated that these outputs may be configured to either drive an LED directly or to connect to an upstream IC. In this manner, the activity and failure or drives connected to one IC may be communicated to additional upstream ICs. Additional details regarding this functionality are provided below.

The EMC IC may also be equipped with circuitry 318 for generating a motherboard activity display. This circuitry 318 may include an input for receiving motherboard activity from a downstream IC (MB_ACT_IN#) and an output (MB_ACT) for driving an LED or communicating a motherboard activity signal to an upstream IC. The IC may also include circuitry 316 for receiving a signal from each of the hard disk drives indicating that the drive has been mated with the backplane. This information may then be communicated to the backplane initiator. The EMC IC also includes an input 320 for receiving an appropriate voltage for powering the operation of the IC (typically +5V DC), an input 322 for connecting to ground, inputs 238A-238B for receiving an appropriate clock signal, an input 324 for enabling a configuration of the IC, and a reset input 326 for resetting the operation of the IC.

The backplane initiator 200 can generate and transfer backplane management data to a backplane in accordance with various particular protocol. For instance, the backplane initiator 200 can utilize commands compatible with SCSI Enclosure Services-2 (SES-2) revision 20, published on May 12, 2008 by T10, a Technical Committee of Accredited Standards Committee INCITS (International Committee for Information Technology Standards), which is incorporated herein by reference in its entirety, to communicate with a SATA or SAS compatible backplane through the system management bus.

Alternatively, the backplane initiator 200 can utilize commands compatible with SFF-8489 Specification for Serial GPIO IBPI (International Blinking Pattern Interpretation), published on Nov. 29, 2011, which is incorporated herein by reference in its entirety, to communicate with a SATA or SAS compatible backplane through an SGPIO interface.

In certain embodiments, the backplane initiator 200 can be configured to emulate control command and the data in accordance with both SES-2 and IBPI specifications.

Additionally, HBA manufacturers may define their own proprietary protocols. In many cases, an HBA manufacturer will utilize a standard protocol, such as IBPI or SES-2, as the foundation for its protocol but will modify the standard protocol to define its own proprietary protocol. For instance, an HBA manufacturer may change the order that data is presented or add particular proprietary data to the protocol. In certain embodiments, the backplane initiator 200 can be configured to emulate control data and commands in accordance with various proprietary protocols.

Figure 4:
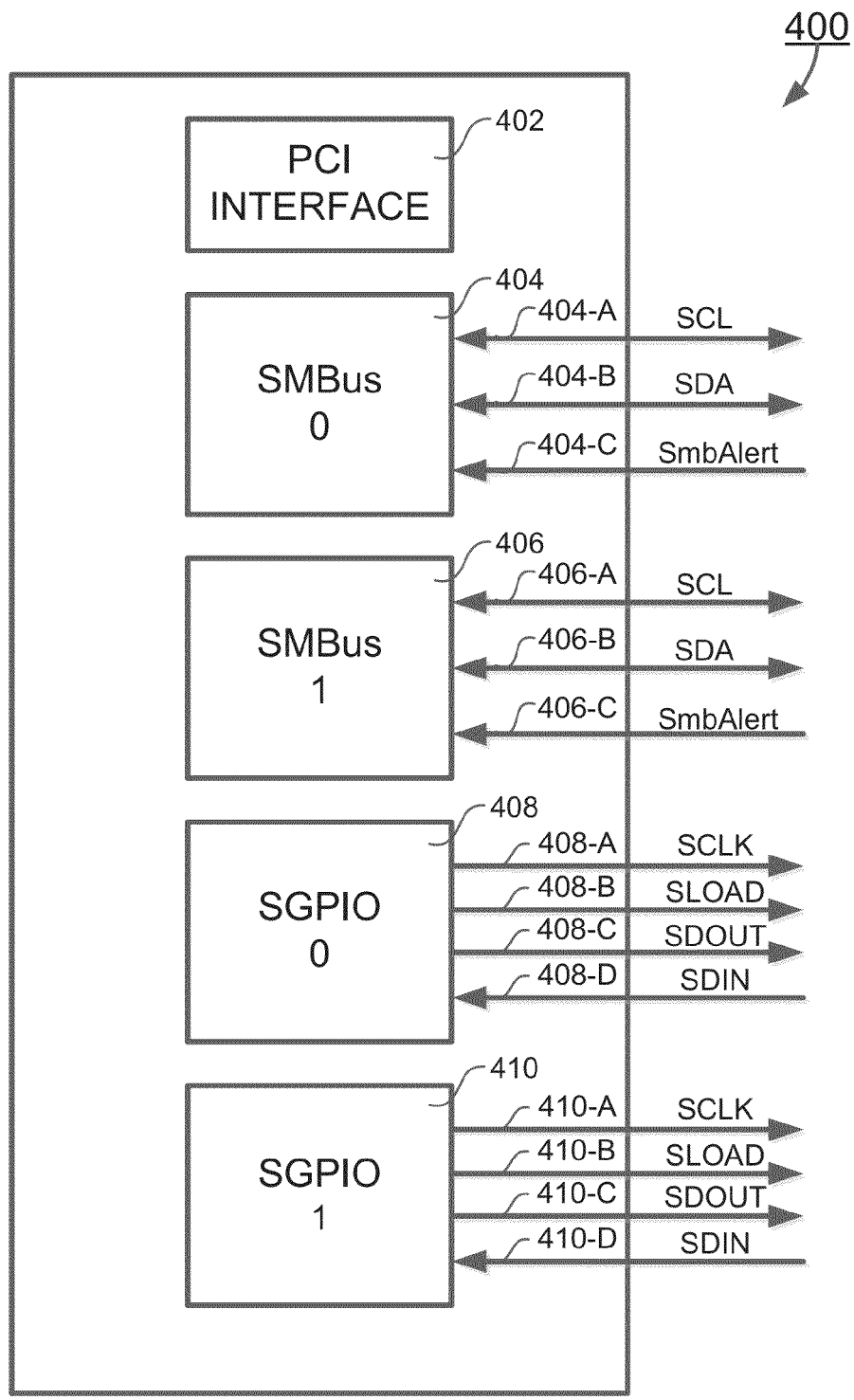
FIG. 4 shows a block diagram of a backplane initiator board according certain embodiments of the present disclosure.

Referring now to FIG. 4, a block diagram of a backplane initiator board 400 is shown according certain embodiments of the present disclosure. The backplane initiator 400 includes: (a) a PCI interface 402, (b) a first SMBus connector 404, (c) a second SMBus connector 406, (d) a first SGPIO connector 408, and (e) a second SGPIO connector 410. The PCI interface 402 can be in communication with a PCI interface of the computer 201 as shown in FIG. 2. Therefore, a initiator control application 600 (see FIG. 6) executing on the computer 201 can communicate with the backplane initiator 200 board through PCI interfaces and instruct the backplane initiator 200 board to generate a control command and data to test an enclosure management controller. Each of the first SMBus connector 404 and the second SMBus connector 406 has: (a) a clock line SCL 404-A and 406-A, (b) a data line SDA 404-B and 406-B, and (c) a SMBus alert line SmbAlert 404-C and 406-C, respectively. Each of the first SGPIO connector 408 and the second SGPIO connector 410 has: (a) a clock line SCLK 408-A and 410-A, (b) a load line SLOAD 408-B and 410-B, (c) a data out line SDOUT 408-C and 410-C, and (d) a data in line SDIN 408-C and 410-C, respectively.

Figure 5:
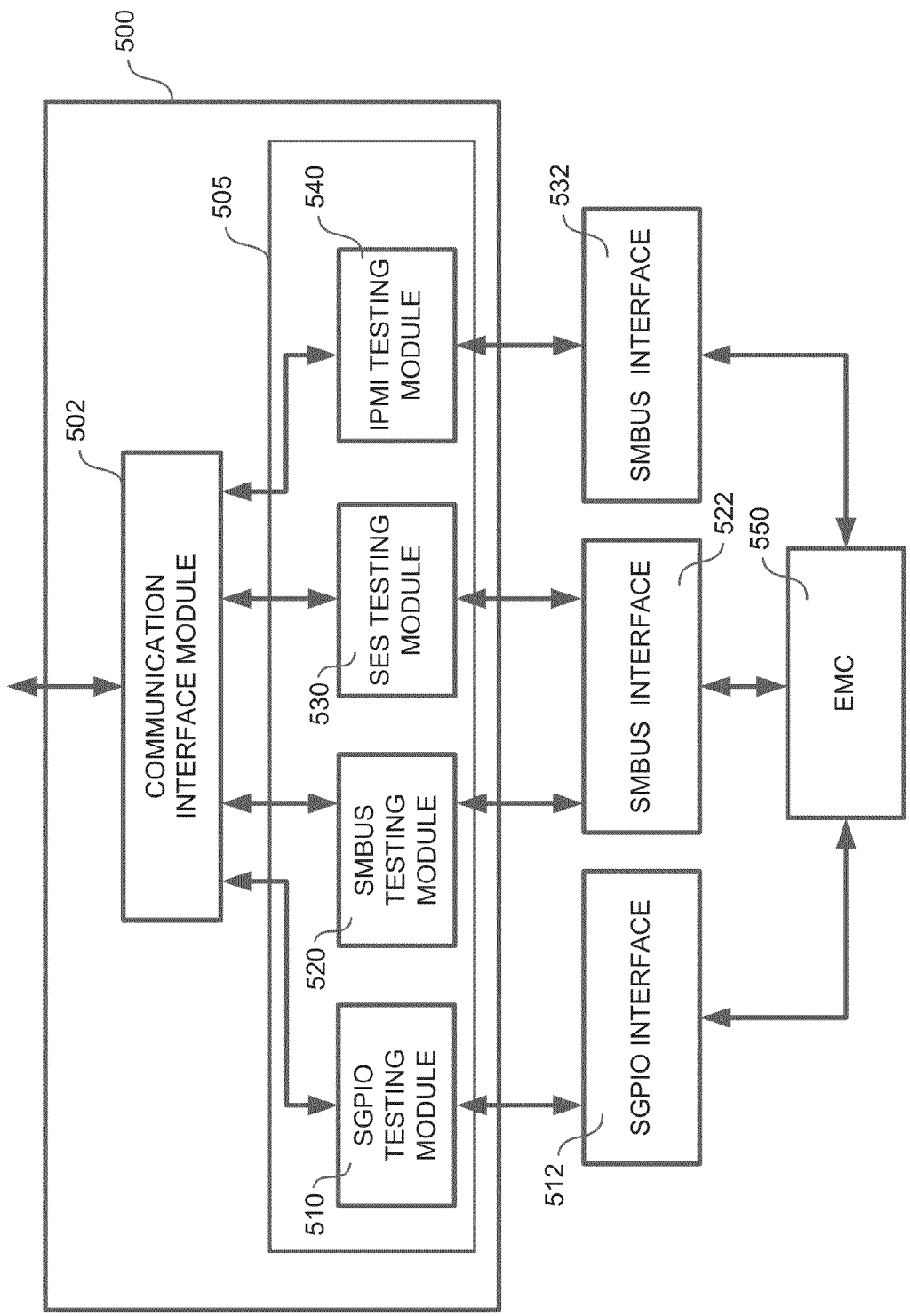
FIG. 5 shows a block diagram of a backplane initiator controller according certain embodiments of the present disclosure.

FIG. 5 shows a block diagram of a backplane initiator controller 500 according certain embodiments of the present disclosure. The backplane initiator controller 500 can include one or more of: a communication interface module 502, a initiator control module 505, an SGPIO Testing Module 504, an SMBus Testing Module 506, and an SES Testing Module 508.

In certain embodiments, the communication interface module 502 is configured to communicate with a communication interface of the computer 201. For example, the communication interface 502 can be a PCI interface. The communication interface 502 receives control commands and the data sent from the initiator control application 600 on the computer 201. The control commands and data are then transferred from the communication interface 502 to the initiator control module 505.

The initiator control module 505 communicate with an EMC 550 over an SGPIO interface 512, an SMBus interface 522, or an SMBus interface 532 to test SGPIO commands, SMBus commands and SES commands, as well as IPMI commands. The initiator control module 505 receives the control commands and data from the communication interface 502, and then sends the control commands and the data to the EMC 224 through, as specified in the control commands and data, one or more of the SGPIO interface 512, the SMBus interface 522, and the SMBus interface 532. The initiator control module 505 can receive corresponding response from the EMC 224 and then send the responses to the initiator control application 600 through the communication interface 502.

In certain embodiments, the initiator control module 505 can include an SGPIO Testing Module 510 that is configured to test the compatibility of the EMC with commands defined by SFF-8489 Specification for Serial GPIO IBPI (International Blinking Pattern Interpretation), published on Nov. 29, 2011, which is incorporated herein by reference in its entirety. For example, the initiator control application 600 can construct control commands and data in accordance with the IBPI specification and transmit those commands and the data, which can form a SGPIO stream, to the initiator control module 505 through the communication interface 502. Accordingly, the initiator control module 505 utilizes the SGPIO Testing Module 510 to send the commands and the data through the SGPIO interface 512 to the EMC 224. The EMC 224 receives the control commands and the data through the SGPIO connector 258A or the SGPIO connector 258B and should accordingly drive the LEDs and other components of the managed enclosure. For example, if the LEDs of the enclosure do not blink correctly in accordance with the control commands and the data, it can be determined that the EMC 224 does not function in accordance with the IBPI specification.

In certain embodiments, the initiator control application 600 can construct control commands and data in accordance with various proprietary protocols over SGPIO and transmit those commands and the data to the initiator control module 505 through the communication interface 502. Accordingly, the initiator control module 505 utilizes the SGPIO Testing Module 510 to send the commands and data of the proprietary protocol through the SGPIO interface 512 to the EMC 224.

In certain embodiments, the initiator control module 505 can include an SMBus Testing Module 520 configured to test the compatibility of the EMC with standard SMBus commands. For example, the initiator control application 600 can construct control commands and data in accordance with the SBMBUS protocol and transmit those commands and data to the initiator control module 505 through the communication interface 502. Accordingly, the initiator control module 505 utilizes the SMBus Testing Module 520 to send the commands and data through the SMBus interface 522 to the EMC 224. The EMC 224 receives the control commands and data through the SMBus connector 259A or the SMBus connector 259B. In certain embodiments, the EMC 224 can respond to the control commands and data accordingly through the SMBus connector 259A for the SMBus connector 259B. For example, if the EMC 224 does not respond accordingly, it can be determined that the EMC 224 does not function correctly in accordance with the SMBus specification.

In certain embodiments, the initiator control module 505 can include an SES Testing Module 530 configured to test the compatibility of the EMC with commands defined by SCSI Enclosure Services-2 (SES-2) revision 20, published on May 12, 2008 by T10, a Technical Committee of Accredited Standards Committee INCITS (International Committee for Information Technology Standards), which is incorporated herein by reference in its entirety. For example, the initiator control application 600 can construct control commands and data in accordance with the SES-2 specification and transmit those commands and data to the initiator control module 505 through the communication interface 502. Accordingly, the initiator control module 505 utilizes the SES Testing Module 530 to send the commands and the data through the SMBus interface 522 to the EMC 224. The EMC 224 receives the control commands and the data through the SMBus connector 259A or the SMBus connector 259B and should accordingly drive the LEDs and other components of the managed enclosure. For example, if the LEDs of the enclosure do not blink correctly in accordance with the control commands and the data, it can be determined that the EMC 224 does not function in accordance with the SES-2 specification.

In certain embodiments, the initiator control application 600 can construct control commands and data in accordance with various proprietary protocols over SMBus and transmit those commands and the data to the initiator control module 505 through the communication interface 502. Accordingly, the initiator control module 505 utilizes the SES Testing Module 530 to send the commands and data of the proprietary protocol through the SMBus interface 522 to the EMC 224.

In certain embodiments, the initiator control module 505 can include an IPMI Testing Module 540 configured to test the compatibility of the EMC with commands defined by Intelligent Platform Management Interface Specification, Second Generation v2.0, Document Revision 1.0, published on Feb. 12, 2004, which is incorporated herein by reference in its entirety. For example, the initiator control application 600 can construct control commands and data in accordance with IPMI specification and transmit those commands and data to the initiator control module 505 through the communication interface 502. Accordingly, the initiator control module 505 utilizes the IPMI Testing Module 540 to send the commands and data through the SMBus interface 532 to the EMC 224. The EMC 224 receives the control commands and data through a SMBus connector. In certain embodiments, the EMC 224 can respond to the control commands and data accordingly through the SMBus connector. For example, if the EMC 224 does not respond accordingly, it can be determined that the EMC 224 does not function correctly in accordance with the IPMI specification. In certain embodiments, the initiator control module 505 can receive and decode IPMI and I2C alert events, and then transmit corresponding data to the initiator control application 600 for display. In certain embodiments, a selected set of extended OEM IPMI commands is also tested for certain OEM vendors.

In certain embodiments, the initiator control module 505 can utilize the first SMBus connector 404 and the second SMBus connector 406 to simulate and test IPMI, SCSI Enclosure Services (SES) and I2C register read/write function supported by the backplane controller.

Figure 6A:
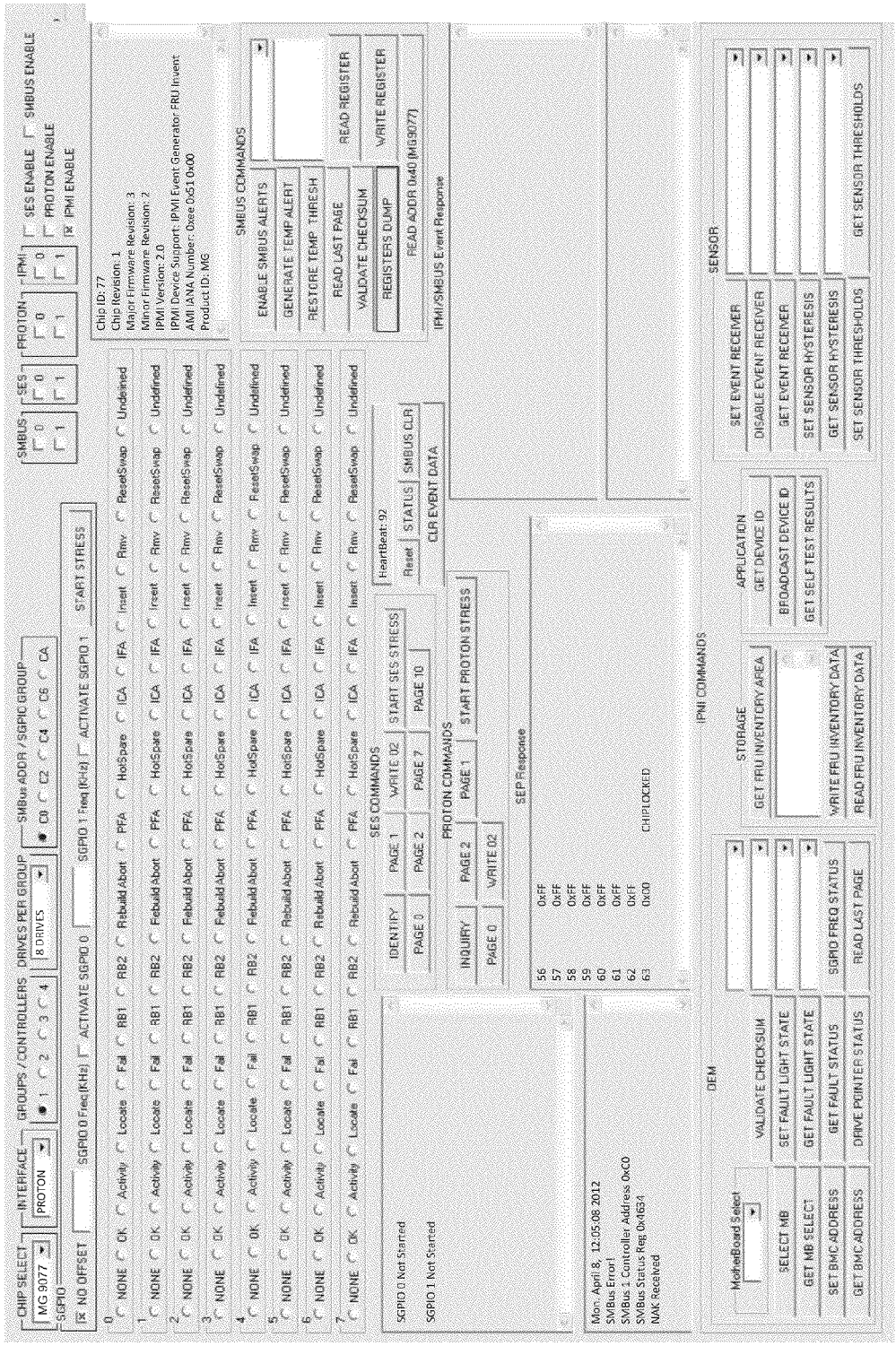
FIGS. 6A-6B illustrate an exemplary initiator control application according to certain embodiments of the present disclosure.
Figure 6B:
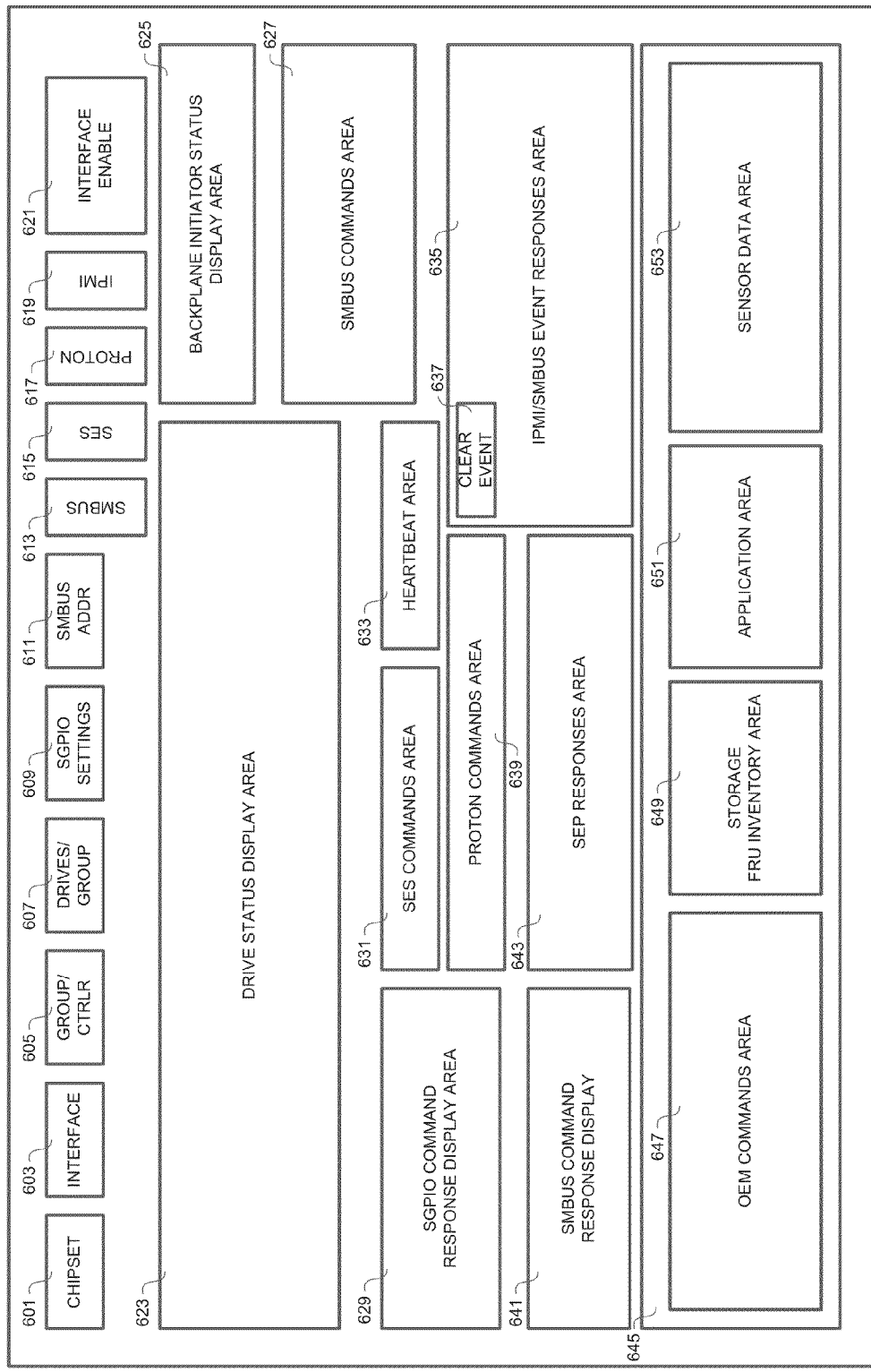

Referring now to FIG. 6A, a screen shot of an exemplary user interface 600 of the enclosure management controller testing program of the backplane initiator is shown according to one embodiment of the present disclosure. FIG. 6B illustrates major sections of the exemplary user interface 600. The user interface 600 includes: (a) a system configuration section, (b) a status display section, (c) a command section, and (d) an event section.

In certain embodiments, the system configuration section includes: (a) a chipset selection 601, (b) an interface selection 603, (c) a group/controller selection 605, (d) a drives per group selection 607, (e) an SGPIO setting 609, (f) an SMBus address and SGPIO group setting 611, (g) a SMBus setting 613, (h) a SCSI Enclosure Services (SES) setting 615, (i) a PROTON setting 617, (j) an IPMI setting 619, and (k) an interface enabler 621. The tester uses the chipset selection 601 to select one of many enclosure management controller chipset available. In the example shown in FIG. 6A, the chipset named MG 9077 is selected. The tester uses the interface selection 603 to select one of many interfaces available, such as PROTON, SES, SMBus, and IPMI. When more than one group of controllers is tested, the tester uses the group/controller selection 605 to select the group to test. In this embodiment, there maybe four groups: group 0, group 1, group 2, and group 3. The drives per group selection 607 are used to set up the number of drives per group to be tested. In this embodiment, eight drives per group are chosen. The SGPIO setting 609 is used to set the register address and the clock frequency of the first SGPIO Bus 408 and the second SGPIO Bus 410. The tester can press the "START STRESS" button to start the stress test. The SMBus address and SGPIO group setting 611 is used to set the SMBus address. Each of the SMBus setting 613, the SES setting 615, the PROTON setting 617, and the IPMI setting 619 has a first checkbox 0 and a second checkbox 1. If the first checkbox 0 is checked, the first SMBus or the first SGPIO bus is used. If the second checkbox 1 is checked, the second SMBus or the second SGPIO bus is used. When one of the checkboxes in the interface enabler 621 is checked, one of the four interfaces SGPIO, SES, PROTON, and IPMI is used. In this embodiment, the IPMI interface is used.

In certain embodiment, the status display section includes: (a) a selected group of drive status display area 623, (b) a backplane initiator status display area 625, (c) a SGPIO command response display area 629, (d) an SMBus command response display area 641, and (e) an SEP response area 643. The selected group of drive status display area 623 displays the group of drives selected for testing, including the presence, the activity, the locate, the failure status, the rebuild 1, the rebuild 2, the PFA, the Hotspare, the ICA, the IFA, and the Underlined status displays for each of the drives in the group. As shown in the system configuration section, there are 8 drives for this group. If the Activity radio button is clicked for a drive, then when this drives is accessed by a computer, the corresponding Activity LED will be blinking. If the Locate radio button is clicked, then the corresponding Locate LED will be lit to show which drive is actually the drive the tester selected. It is used for the tester to locate each individual drive. The backplane initiator status display area 625 displays the specific information about the EMC chipset, such as Chip ID is 86, the Chip Revision is 1, the major and minor Firmware revisions are 3 and 2, the IPMI version is 2.0, and IPMI device support: IPMI Event Generator FRU inventory Device. The SGPIO command response display area 629 displays information in response to the SGPIO commands entered by the tester. In the example shown in FIG. 6A, the responses are: "SGPIO 0 Not Started", and "SGPIO 1 Not Started". The SMBus command response display area 641 displays information in response to the SMBus commands entered by the tester. In this example, a SMBus error is encountered. The controller address on the first SMbus is 0xC0, and the first SMBus register address is at 0x4634. The SEP Responses Area 643 displays information in response to the SEP commands entered by the tester.

In certain embodiments, the command section includes: (a) an SMBus command area 627, (b) an SES command area 631, (c) a PROTON command area 639, and (d) an IPMI command area 645. The SMBus command area 627 includes command buttons such as "Enable SMBus Alert", "Generate Temp Alert", "Restore Temp Threshold", "Read Last Page", "Validate CheckSum", "Register Dump", "Read Register", "Write Register" and "Read Addr 0x40". Next to the "Enable SMBus Alert" button, there is a pull-down menu to allow the test to select specific SMBus alert to be displayed at an area below the pull-down menu. The SES command area 631 includes command buttons such as "Identify", "Page 0", "Page 1", "Page 2", "Write 02", "Page 7", "Page 10", and "Start SES Stress". The PROTON command area 639 includes command buttons such as "Inquiry", "Page 0", "Page 1", "Page 2", "Write 02", and "Start PROTON Stress".

In certain embodiments, the IPMI Command area 645 includes: (a) an OEM command area 647, (b) a Storage FRU Inventory Area 649, (c) an Application Area 651, and (d) a Sensor Data Area 653. The OEM command area 647 includes a motherboard selection pull-down menu for the tester to select a motherboard to test, and command buttons such as: "Select MB", "Get MB Select", "Set BMC Address", "Get BMC Address", "Validate CheckSum", "Set Fault Light State", "Get Fault Light State", "Get Fault Status", "Drive Pointer Status", SGPIO Frequency Status", and "Read Last Page". The Storage FRU Inventory Area 649 includes command buttons such as "Get FRU Inventory Area", "Write FRU Inventory Data", and "Read FRU Inventory Data". The Application Area 651 includes command buttons such as "Get Device ID", "Broadcast Device ID", and "Get Self Test Result". The Sensor Data Area 653 includes command buttons: a first "Set Event Receiver" with a pull-down menu to allow the tester to set the Event Receiver, "Disable Event Receiver" with a pull-down menu to allow the tester to disable the Event Receiver, a second "Set Event Receiver" with a pull-down menu to allow the tester to set the Event Receiver, "Set Sensor Hysteresis" with a pull-down menu to allow the tester to set the Sensor Hysteresis, "Get Sensor Hysteresis" with a pull-down menu to allow the tester to get the Sensor Hysteresis, "Set Sensor Thresholds" and "Get Sensor Thresholds".

In certain embodiments, the event section includes IPMI and SMBus event response area 635. This area is used to display the event log while the EMC is been tested. It includes all IPMI event logs and the SMBus event logs.

FIGS. 6A and 6B showed only one exemplary user interfaces, many modifications and customizations can be made without departing the scope and spirit of the present disclosure.

The foregoing description of the exemplary embodiments of the present disclosure has been presented only for the purposes of illustration and description and is not intended to be exhaustive or to limit the present disclosure to the precise forms disclosed. Many modifications and variations are possible in light of the above teaching.

The embodiments were chosen and described in order to explain the principles of the present disclosure and their practical application so as to enable others skilled in the art to utilize the present disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

The invention claimed is:

1. A backplane initiator for testing an enclosure management controller (EMC), comprising:
   an initiator board, including:
      an initiator controller;
      at least one SGPIO interface;
      at least one SMBus interface; and
      a first communication interface, wherein the initiator controller is configured to transmit control commands and control data in accordance with an enclosure management protocol through at least one of the SGPIO interface and the SMBus interface to an EMC; and
   an initiator control application, when executed on a computing device having a second communication interface in communication with the first communication interface, configured to
      establish a communication channel with the initiator controller through the first and second communication interfaces, and
      instruct the initiator controller to transmit a first control command and first control data in accordance with an enclosure management protocol through at least one of the SGPIO interface and the SMBus interface to the EMC.

2. The backplane initiator of claim 1, wherein the first and second communication interfaces are peripheral component interconnect (PCI) interfaces.

3. The backplane initiator of claim 1, wherein the initiator controller is configured to receive testing instructions from the initiator control application and send a corresponding testing command to the EMC over at least one of the SGPIO interface and the SMBus interface and, wherein the at least one SMBus interface includes a first SMBus interface and a second SMBus interface, wherein the backplane initiator further comprises at least one of:
   an SGPIO testing module configured to send a plurality International Blinking Pattern Interpretation (IBPI) testing commands to the EMC over the SGPIO interface;
   an SMBus testing module configured to send a plurality of SMBus testing commands to the EMC over the first SMBus interface;
   an SCSI Enclosure Services (SES) testing module configured to send a plurality of SES testing commands to the EMC over the first SMBus interface; and
   an IPMI testing module configured to send a plurality of IPMI testing commands to the EMC over the second SMBus interface.

4. The backplane initiator of claim 3, wherein the plurality IBPI testing commands comprises one or more standard IBPI commands defined in the IBPI specification.

5. The backplane initiator of claim 3, wherein the plurality of SMBus testing commands comprises one or more standard SMBus commands defined in the SMBus specification.

6. The backplane initiator of claim 3, wherein the plurality of IPMI testing commands comprises one or more standard IPMI commands defined in the IPMI specification.

7. The backplane initiator of claim 6, wherein the plurality of IPMI testing commands comprises a plurality of extended OEM IPMI commands.

8. The backplane initiator of claim 1, wherein the first control command and the first control data are configured to in accordance with the SES specification to instruct the EMC to drive a plurality of light emitting diodes (LEDs) installed on an enclosure managed by the EMC.

9. The backplane initiator of claim 1, wherein the initiator control application comprises a graphic user interface that allows a user to input the first control command and first control data.

10. A computer-implemented method for testing an enclosure management controller (EMC), the method comprising:
   providing an initiator board, including:
      an initiator controller;
      at least one SGPIO interface;
      at least one SMBus interface; and
      a first communication interface;
   transmitting control commands and control data, at a initiator controller, in accordance with an enclosure management protocol through at least one of the SGPIO interface and the SMBus interface to an EMC;
   executing an initiator control application on a computing device having a second communication interface in communication with the first communication interface;
   establishing, at the initiator control application, a communication channel with the initiator controller through the first and second communication interfaces; and
   instructing, at the initiator control application, the initiator controller to transmit a first control command and first control data in accordance with an enclosure management protocol through at least one of the SGPIO interface and the SMBus interface to the EMC.

11. The computer-implemented method of claim 10, wherein the first and second communication interfaces are peripheral component interconnect (PCI) interfaces.

12. The computer-implemented method of claim 10, wherein the initiator controller is configured to receive testing instructions from the initiator control application and send a corresponding testing command to the EMC over at least one of the SGPIO interface and the SMBus interface and, wherein the at least one SMBus interface includes a first SMBus interface and a second SMBus interface, wherein the backplane initiator further comprises at least one of:
- an SGPIO testing module configured to send a plurality International Blinking Pattern Interpretation (IBPI) testing commands to the EMC over the SGPIO interface;
- an SMBus testing module configured to send a plurality of SMBus testing commands to the EMC over the first SMBus interface;
- an SCSI Enclosure Services (SES) testing module configured to send a plurality of SES testing commands to the EMC over the first SMBus interface; and
- an IPMI testing module configured to send a plurality of IPMI testing commands to the EMC over the second SMBus interface.

13. The computer-implemented method of claim 12, wherein the plurality IBPI testing commands comprises one or more standard IBPI commands defined in the IBPI specification.

14. The computer-implemented method of claim 12, wherein the plurality of SMBus testing commands comprises one or more standard SMBus commands defined in the SMBus specification.

15. The computer-implemented method of claim 12, wherein the plurality of IPMI testing commands comprises one or more standard IPMI commands defined in the IPMI specification.

16. The computer-implemented method of claim 12, wherein the plurality of IPMI testing commands comprises a plurality of extended OEM IPMI commands.

17. The computer-implemented method of claim 10, wherein the first control command and the first control data are configured to in accordance with the SES specification to instruct the EMC to drive a plurality of light emitting diodes (LEDs) installed on an enclosure managed by the EMC.

18. The computer-implemented method of claim 10, wherein the initiator control application comprises a graphic user interface that allows a user to input the first control command and first control data.

19. A non-transitory computer storage medium having computer-executable instructions stored thereon which, when executed by a processor of a computing device, the computing device having a second communication interface, cause the processor to:
- communicating with an initiator board through a first communication interface of the initiator board, wherein the initiator board comprises:
  - an initiator controller;
  - at least one SGPIO interface;
  - at least one SMBus interface; and
  - a first communication interface in communication with the second communication interface, wherein the initiator controller is configured to transmit control commands and control data in accordance with an enclosure management protocol through at least one of the SGPIO interface and the SMBus interface to an EMC; and
- executing an initiator control application;
- establishing, through the initiator control application, a communication channel with the initiator controller through the first and second communication interfaces; and
- instructing, through the initiator control application, the initiator controller to transmit a first control command and first control data in accordance with an enclosure management protocol through at least one of the SGPIO interface and the SMBus interface to the EMC.

20. The non-transitory computer storage medium of claim 19, wherein the first and second communication interfaces are peripheral component interconnect (PCI) interfaces.

* * * * *